Sept. 29, 1964     E. D. HARTLEY     3,150,600
FLUID HANDLING DEVICE
Filed July 7, 1958     5 Sheets-Sheet 1

INVENTOR.
EZRA DALE HARTLEY
BY
ATTORNEY

Sept. 29, 1964  E. D. HARTLEY  3,150,600
FLUID HANDLING DEVICE
Filed July 7, 1958  5 Sheets-Sheet 2

INVENTOR.
EZRA DALE HARTLEY
BY
ATTORNEY

Sept. 29, 1964     E. D. HARTLEY     3,150,600

FLUID HANDLING DEVICE

Filed July 7, 1958     5 Sheets-Sheet 3

INVENTOR.
EZRA DALE HARTLEY
BY
ATTORNEY

3,150,600
FLUID HANDLING DEVICE
Ezra Dale Hartley, Los Angeles, Calif., assignor to The Flo-Motive Corporation, Los Angeles, Calif., a corporation of California
Filed July 7, 1958, Ser. No. 746,895
21 Claims. (Cl. 103—142)

This invention relates to fluid handling devices and more particularly to an improved self-contained power driven fluid handling device of the type employing a conical-ended rotor rotating in a spherical cavity with one face rotating either in sealing contact with a closure plate for the cavity or in closely spaced relation thereto and exhibiting features and characteristics not realized heretofore.

Fluid pumps utilizing a spherically-shaped cavity and supporting therewithin a conically-ended rotor tilted to have one of its radial face elements lying parallel to a closure plate for the pump have been known for more than a century and have received much study by designers in attempts to make more effective and efficient use of their interesting potentialities. Despite this close and long-continuing study, designs heretofore proposed have been subject to many shortcomings and deficiencies sought to be obviated by this invention. So far as known, all operable prior designs have employed a single moving vane movably carried by the rotor. A few designs have been proposed making use of two vanes intersecting one another at right angles with a view to improving the characteristics of the pump but no successful design of this type is known. One of the particularly troublesome problems atending the use of a pair of vanes has been that of providing for the movement of the vanes relative to one another while maintaining a fluid seal at the intersection of the vanes. The leakage losses characteristic of prior two vane pumps have been so serious and the solution of the sealing problem so baffling that designers appear to have concentrated their efforts on attempts to improve the single vane version.

The present invention provides a fully satisfactory solution to the sealing problem at the intersection of multiple vanes, a preferred embodiment making use of a floating spherical sealing element having one surface seated against the cavity closure plate and its opposite surface socketed in a mating cavity formed at the intersection of the vanes. This arrangement allows the vanes to move independently of one another throughout their operating range while maintaining a high efficiency fluid seal between all chambers of the fluid cavity. This seal is so effective that the device is admirably suited for such diverse applications as a fluid meter, a gas compressor, a fluid-driven motor, and a liquid pump.

Another serious shortcoming of prior designs fully overcome by the present invention is an improved arrangement and design of the fluid inlet and outlet ports with the result that the present device functions with an efficiency not heretofore approached.

For example, when using a rotor having a single vane it is mandatory that the inlet and outlet ports be confined to the same side of a diametric plane through the cavity and lying to either side of the line of sealing contact between the conical rotor face and the cavity closure plate. Certain unavoidable limitations and losses are inherent in this porting arrangement. By using two vanes spaced equidistantly, it is possible to space the inlet and outlet ports diametrically of one another as well as to increase the port area very appreciably. So many important advantages follow from this permissible arrangement of the ports that it is difficult to over-emphasize the importance of this feature. Of particular importance is the fact that the use of two vanes in the manner here disclosed permits the flow area into the displacement cavity to be increased by approximately 72 percent over the flow area feasible in a single vane design. The larger flow area minimizes choking of the fluid flow, permits higher flow rates and avoids the undesirable consequences of cavitation attending the use of small port areas.

Another highly important advantage bottomed on the diametric disposition of the ports with each subtending an arc of 90 degrees resides in the fact that a major portion of the relative movement of the vanes in their supporting slots can take place while the vanes are traversing the ports and are substantially unloaded. For example, in the design here illustrated, only 14 percent of the total vane travel occurs under working pressure conditions in contrast with a 100 percent relative travel of the vane and rotor under working pressure conditions in a single vane design.

Still another highly impotrant aspect of the diametric porting arrangement is the fact that the vanes may be utilized to separate the inlet and outlet ports from one another rather than relying upon a continuous seal between the closure plate and a radial element of the rotor as is essential in a single vane construction. In consequence, it is feasible to space the conical face of the rotor out of sealing engagement with the closure plate or, preferably, to relieve the surfaces of the conical rotor between vanes without in anywise adversely affecting the volumetric efficiency. Not only does this reduce manufacturing tolerance problems and avoid the need for maintaining a running seal between the conical face of the rotor and the closure plate, but provides for the recirculation of fluid. This spacing also avoids the serious consequences of foreign particles becoming lodged along the line of seal-off between the rotor and closure plate.

By relieving the quadrant faces of the rotor between vanes by a predetermined amount, adequate fluid can be recirculated to maintain a liquid layer of desired depth on the spherical wall of the displacement cavity. Normally, the radial depth of the fluid so recirculated is adequate to underlie the outer rim edge of the closure plate inwardly of the cavity wall. Filling this portion of the displacement cavity avoids the possibility of cavitation, a factor which can assume critical importance in handling volatile liquids.

Another feature of the present invention is a design having minimum pulsing or variation in flow rate. In fact, by the simple expedient employed in one preferred embodiment of the invention, pulsing and variation in the flow rate can be entirely eliminated. Furthermore, it is possible to convert from an inexpensive construction exhibiting slight pulsing characteristics to one of maximum efficiency having a uniform flow rate free of pulsations by the simple expedient of replacing its combined manifold and closure plate with a substitute incorporating a specially-contoured surface cooperating with the vanes to eliminate flow variations.

Another embodiment of the invention makes use of still another manifold and closure plate assembly when the device is to be employed as a compressor or as a pneumatically-operated motor. In such applications, the conical end of the rotor should have sealing engagement with the closure plate, with the seal serving to separate a small area high-pressure fluid port from a large area low-pressure port. The high-pressure port occupies a relatively small area in comparison with the large area low-pressure port. The use of the two-vaned rotor of the present invention with the described porting arrangement makes it feasible to utilize inlet and outlet ports of maximum area confined to one side of a diametric line through the rotor cavity. In this arrangement the gas may undergo continuous compressing while fully confined in the rotor cavity during a full quarter revolution of the rotor, a highly desirable feature not possible in related prior designs. There results major gains in operating efficiency not otherwise achievable.

Other important objects of the invention relate to the provision of a unitary fluid handling unit having a self-contained power unit coupled directly to the rotor and journaled on a hub integral with the unit casing. Numerous advantages flow from this arrangement including those of accurately finishing the seats for the supporting bearings of the common shaft for the rotor and motor in true alignment with the precision surfaces of the unit pumping cavity. Another feature is the provision of oppositely-facing cupped cavities separated by a common integral end wall intermediate the pumping chamber from the motor chamber. Also integral with this end wall is a hollow hub supporting a common shaft for the motor and the pump.

The motor shaft is journaled in a pair of anti-friction bearing assemblies so supported relative to the shaft and the hollow hub that the adjustment of a single control nut is effective to preload the two bearing assemblies in opposition directions and in a manner eliminating all possibility of end play of the shaft and of the pump rotor secured thereto. This arrangement assures the accurate and high precision positioning of the rotor in the pump cavity thereby greatly minimizing frictional losses, reducing wear of the parts, and assuring the long life of the fluid seals between the several relatively moving surfaces.

A fluid handling unit having such characteristics as those referred to above is suitable for use in a multitude of applications. Among the particularly advantageous applications is in fuel systems for aircraft and particularly craft operating to extremely high altitudes. The highly volatile fuels used in the engines of such craft imposes unusually severe requirements on the pumps required to transfer the fuel from point to point on the craft as well as in supplying the fuel to the engines under desired pressure and volume conditions. Owing to the high vapor pressures of aircraft fuels and widely varying atmospheric pressure conditions between ground and high level operating conditions, cavitation and vapor lock problems caused in part by these factors, much difficulty has been experienced in providing a satisfactory and sufficiently flexible and reliable fuel supply system.

The pump having the various features of the present invention has proven itself highly successful in obviating the foregoing and other shortcomings of prior aircraft fuel supply systems. Pulsation and fluid flow can be entirely eliminated by use of a specially-contoured guide plate for the vanes forming a feature of the invention. The large area of the ports taken with the disposition of the ports relative to the pump cavity and to the vanes reduces the tendency for cavitation. The unit is self-priming and immune to vapor lock. Furthermore, the pump is equally suitable for use as a booster pump or as a fuel transfer pump. When used as a booster pump to supply fuel under pressure to the inlet of a higher pressure pump, the possibility of flow failure due to a locked rotor or motor is avoided by the use of an automatic pressure-responsive bypass valve opening into the discharge side of the pump cavity. Hence, if the motor or rotor should become stalled or locked for any reason, the suction pressure of the high-pressure pump is effective to open the bypass valve and transfer fuel directly from the supply tank.

Accordingly, it is a primary object of the present invention to provide an improved fluid handling unit obviating the shortcomings and disadvantages of prior structures of a related type and operating with an effectiveness and efficiency not possible with prior designs.

Another object of the invention is the provision of a fluid handling device having a cupped displacement cavity rotatably seating a generally conically-ended rotor having its axis inclined to the interior surface of a closure plate for the cavity and movably seating a plurality of relatively movable vanes in diametric slots thereacross.

Another object of the invention is the provision of a fluid handling unit having a cupped displacement cavity rotatably seating a conically-ended rotor movably seating a pair of blades having straight exposed edges in sealing engagement with a closure plate for the cavity and further characterized in that the quadrant chambers formed by the vanes are sealed from one another by means including a floating seal at the intersection of the vanes.

Another object of the invention is the provision of a fluid handling device of the character described and wherein the fluid inlet and outlet ports are diametrically opposed and have areas covering the major portion of opposed quadrants of the displacement cavity.

Another object of the invention is the provision of a fluid handling device of the character described wherein the inlet and outlet ports are diametrically opposed and spaced substantially midway between a plane passing through the rotor axis and a radial displacement zone of minimum depth.

Another object of the invention is the provision of a fluid handling device having a conically-ended rotor journaled for rotation in a spherical cavity with one radial element of its end surface closely spaced to a closure plate for the cavity and movably supporting a pair of diametric vanes spaced 90 degrees apart with their advancing faces inclined in a direction to entrain fluid into the displacement cavity as the vanes rotate past the inlet port and to expel fluid into the outlet passage as they pass the outlet port.

Another object of the invention is the provision of a fluid handling device having a spherical displacement cavity occupied by a vaned rotor and wherein the vanes have sealing engagement with a closure plate for the cavity, the latter being provided with large area diametrically-opposed fluid ports, the radial extent of the ports being sufficiently less than the radius of the cavity as to provide a supporting surface for the outer ends of the blades while passing the ports.

Another object of the invention is the provision of a fluid handling device having a displacement cavity occupied by a rotating conically-ended rotor provided with a pair of diametric vanes spaced substantially 90 degrees apart and wherein the radial elements of the conical end pass a closure for the cavity in closely-spaced parallel relation thereto, such spacing being obtained either by spacing the conical end of the rotor from the end plate or by relieving the surface of the rotor between the vane-seating slots.

Another object of the invention is the provision of a fluid handling device having a semi-spherical cavity seating a conically-ended rotor provided with a pair of diametric vanes having sealing engagement with a closure plate for the cavity, the inner surface of which is inclined to the axis of rotor rotation, said device having provision for recirculating a predetermined quantity of fluid centrifugally distributed against the cavity side wall during filling of the cavity and serving to minimize, if not prevent, cavitation during filling.

Another object of the invention is the provision of a self-contained motor-driven fluid handling unit having a unitary casing provided with oppositely-facing cavities, one of which seats a vaned rotor and the other a driving motor connected together by a common shaft.

Another object of the invention is the provision of a unitary motor-driven fluid handling device wherein the vaned rotor is mounted directly on the motor shaft and featuring adjustable means for preloading the shaft bearings in opposite directions to eliminate end play and to lock the rotor in a predetermined position relative to the opposed walls of the fluid displacement cavity.

Another important object of the invention is the provision of a positive displacement fluid handling device employing a conically-ended rotor operating in a semi-spherical displacement cavity and provided with a plurality of intersecting, independently-movable vanes having sealing engagement with an end wall of the cavity, which end wall is so contoured as to provide a constant fluid flow.

Another object of the invention is the provision of a pump of the type described and readily convertible to and from a constant flow device by substituting a flat surfaced closure plate for the displacement cavity with one having a specially contoured vane contacting surface.

Another object of the invention is the provision of a fluid handling device suitable for use selectively as a gas compressor or as a pneumatically-driven motor and featuring a two-vaned rotor operating in a semi-spherical cavity and having a pair of ports in its closure plate disposed to one side of a diametric plane through the displacement cavity and wherein one port has an area several times that of the other port.

Another object of the invention is the provision of a positive-displacement fluid pump driven by a motor enclosed within the unit and featuring an automatically-opening, normally-closed bypass valve having its inner end communicating with a pump discharge and its outer end in communication with the fluid inlet.

These and other more specific objects will appear upon reading the following specification and claims and upon considering in connection therewith the attached drawings to which they relate.

Referring now to the drawings in which preferred embodiments of the invention are illustrated.

Figure 1:
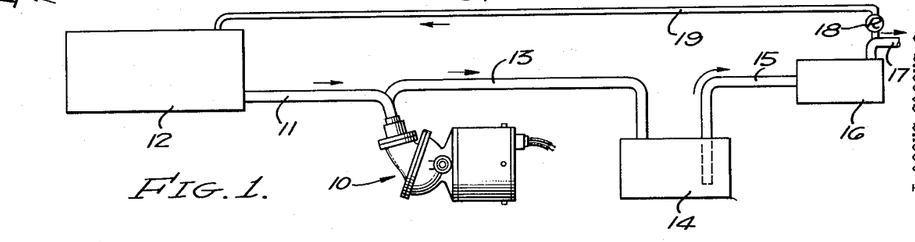
FIGURE 1 is a schematic representative of a fuel supply system for an aircraft engine utilizing the pump of the present invention as a fuel-transfer pump.

Referring to the drawings and more particularly to FIGURE 1, there is shown a fluid handling device incorporating the present invention, designated generally 10, and employed as a fuel transfer pump in an aircraft engine fuel supply system. The inlet of pump 10 is shown connected through a conduit 11 with fuel storage tank 12, the pump outlet discharging through conduit 13 into an intermediate storage tank 14 having an outlet pipe 15 connected to the inlet of a high pressure pump 16.

The output of pump 16 discharges through conduit 17 leading to the engine fuel nozzles, the pressure being maintained constant by an automatic pressure relief valve 18 of any suitable character. Surplus fuel is returned to the main fuel tank 12 by conduit 19. The relief of pressure on the excess fuel at valve 18 is likely to result in vaporization of a considerable portion of the excess fuel. However, the presence of large quantities of vaporized fuel in tank 12 has a minimum adverse effect on the operation of the fuel system owing to the characteristics of the improved positive displacement fuel transfer pump 10 for reasons which will become apparent from the detailed description now to be given.

Figure 2:
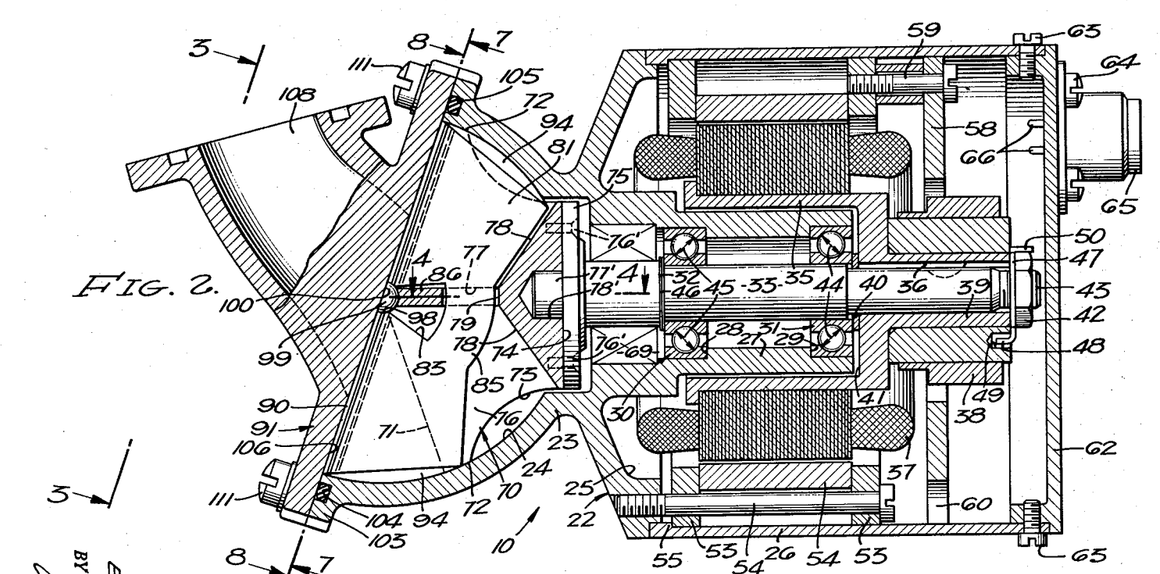
FIGURE 2 is a transverse sectional view through the pump unit shown in FIGURE 1.
Figure 3:
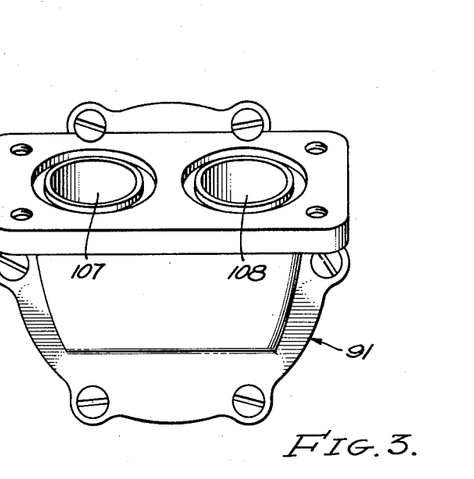
FIGURE 3 is an end elevational view of the combined manifold and closure plate for the displacement cavity as viewed from a plane indicated at 3—3 on FIGURE 2.

Referring now more particularly to FIGURE 2, the unitary motor pump unit 10 will be understood to include a unitary casing 22 having an integral end wall 23 one side of which is provided with a semi-spherical fluid displacement cavity 24 and a generally tubular cavity 25 formed in part by a generally cylindrical shell 26 to provide a housing for an electric motor. Integral with casing wall 23 and concentrically of shell 26 is an inner hollow hub 27 formed with oppositely opening shouldered recesses 28, 29 against which the outer races of a pair of anti-friction bearing assemblies 30, 31 are pressed. The inner raceway of bearing assembly 30 is pressed against a shoulder 32 of motor shaft 33 whereas the inner raceway of bearing assembly 31 has a close frictional fit with the motor shaft and is adapted to be pressed toward bearing assembly 30 to preload the anti-friction elements of both assemblies in a manner which will be explained presently.

A second hollow hub 35 surrounds inner hub 27 and has one end thereof secured by a key 36 to the right hand end of motor shaft 33 as viewed in FIGURE 2. Motor armature 37 is suitably secured to the larger diameter portion of outer hub 35 and the motor commutator assembly 38 is anchored to the reduced diameter portion 39 of this same hub.

An important feature of the invention resides in the provision of means for preloading bearing assemblies 30, 31 in opposite directions, for adjusting the axial position of shaft 33 relative to cavities 24 and 25 and for preventing any end play of the shaft. Reference is had to a thrust ring 40 having one face bearing against end surface 41 of hub 35 and its other face bearing against the end of the inner raceway of bearing assembly 31. Adjustable nut 42 threaded over end 43 of shaft 33 is effective as it is tightened to shift hub 35 along the shaft lengthwise of locking key 36 thereby bringing pressure against the inner raceway of bearing assembly 31 to shift it along the shaft despite the frictional fit therewith and placing the anti-friction elements of that assembly under preload as is indicated by arrows 44. At the same time, the inner raceway of assembly 30 is shifted by shoulders 32 toward the right, as viewed in FIGURE 1, thereby preloading the anti-friction elements of that assembly in an opposite direction as is indicated by arrows 45.

It is pointed out that one or more shim rings 46 are interposed between shoulder 32 and the inner raceway of bearing assembly 30 for the proper positioning of spherical surface 72 of rotor 70 relative to cavity wall 24 coupled with the desired pre-loading of bearing assemblies 30, 31. Accordingly, nut 42 may be adjusted as necessary to seat the fluid handling rotor in cavity 24 without danger of exceeding an optimum preload stress on the anti-friction elements. Locking of the adjustment in a desired setting is accomplished by the use of a lock washer 47 having one tab 48 anchored in a recess 49 of the commutator assembly and a second tab 50 arranged to be bent over against a face of nut 42.

It will be understood that the motor includes the usual field core assembly 52 here shown as sandwiched between a pair of mounting rings 53, 53 having a close frictional fit with the interior of motor shell 26 and held assembled to the rim of the unit casing by long cap screws 54, there being a number of these screws distributed about the periphery of the field core assembly. Preferably, and as is shown in FIGURE 2, the inner one of mounting rings 53 bears against an inwardly extending flange 55 of shell 26 in order that cap screws 54 may be employed to hold both the field core 52 and shell 26 anchored to the shouldered rim of casing 23 in the manner made clear by FIGURE 2.

The motor brush assembly is not shown in FIGURE 2, but will be understood to be mounted on an insulation ring 58 rigidly secured to field core ring 53 as by cap screws 59. Preferably ring 58 is provided with openings 60 opposite the heads of cap screws 54 in order that the field core structure may be removed as a unit without disturbing the brush mounting assembly.

The open outer end of motor shell 26 is normally closed by a flanged cap 62 having a snug fit with the rim of shell 26 and secured thereto as by cap screws 63. Securely mounted on the cover plate as by screws 64 is the female portion of a junction fitting 65 to which a cable containing the electrical leads for the motor may be connected, it being understood that the motor connections, not shown, are connected to the inner ends of terminals 66 forming part of fitting 65.

Figure 4:
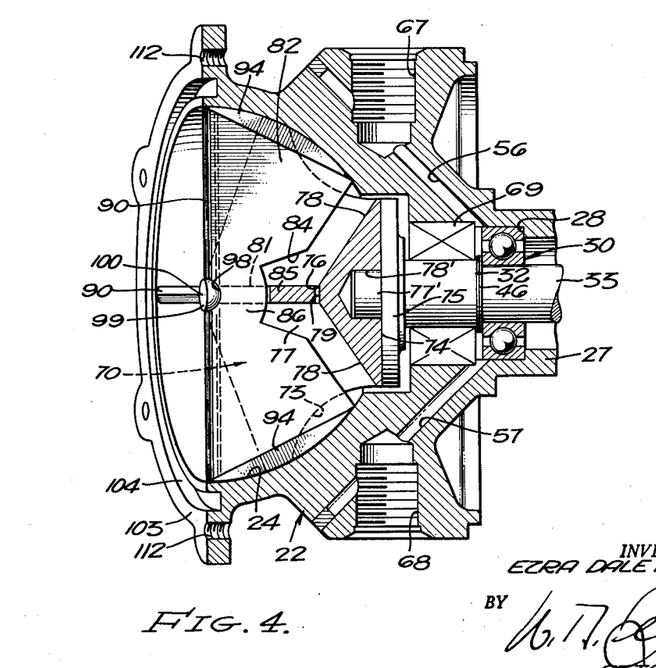
FIGURE 4 is a transverse sectional view taken through the pump casing along line 4—4 on FIGURE 2.

Referring to FIGURE 4, it is pointed out that a suitable shaft seal 69 preferably of the well known face seal type is seated in an annular cavity of casing 23 in the area between shaft flange 75 and bearing assembly 30. It is possible that a slight amount of fluid may leak past this seal from the displacement cavity. Over a period of time such leakage could accumulate and contaminate the motor bearings and even the motor. To safeguard against these undesirable consequences, the casing is provided with drainage means here shown as comprising a pair of passages 56, 57 opening into the seal well at diametrically opposed points. The outer ends of these passages open into threaded wells 67 and 68 for convenience in the connection of the same to a drain conduit. Normally the device is mounted with a selected one of wells 67, 68 lowermost, the other then being capped. The outer ends of passages 56, 57 are plugged in the manner illustrated.

The fluid handling device proper will now be described, reference being had in particular to FIGURES 2 through 8. The generally cup-shaped casing 23 is interiorly formed with a semi-spherical cavity 24 terminating in a rim edge lying in a plane at an obtuse angle to the axis of motor shaft 33. Rotatably seated in this cavity is a one piece rotor 70 having a generally conical end 71 merging at its rim edge with the spherical surface 72 complemental to the spherical surface of cavity 24. Desirably, the width of spherical surface 72 is relatively narrow to minimize the area of contact with cavity 24 but adequate to form a reasonably fluid tight seal with the cavity surface. The remaining rearward portion of the rotor is relieved or cut away as along the annular surface indicated at 73 to provide a limited fluid storage space on the rear side of the rotor as well as provision for the free passage of fluid as the vanes carried by the rotor pivot to and fro in a manner which will be described presently.

The rear end surface 74 of the rotor is here shown as terminating in a plane normal to the axis of the conical surface 71 and is rigidly secured to the flanged end 75 of shaft 33, as by screws 76'. Accurate centering of the rotor relative to the axis of shaft 33 is assured by a boss 77' carried by the shaft and seating snugly in a well 78' opening into the rear end of the rotor.

Rotor 70 is provided with a pair of identical diametric slots 76, 77 opening through the conical end 71 thereof and arranged at right angles to one another. The bottom 78 of each slot diverges rearwardly toward the peripheral edges of rotor and surface 74 in the manner best shown in FIGURE 2. The apex of the merging bottom walls 78 is cut off at 79 to avoid contact with the arcuate edge of web 85 of vane 71 to the end that the spherical ends of the vane will seat freely against the similarly shaped wall of cavity 24. The adjacent edges of web 85 and 86 are similarly spaced apart for the same purpose. It will therefore be recognized that the vanes seat floatingly against surface 106 of closure plate 91 and against the spherical surface of cavity 24.

Seated in slots 76 and 77 respectively, are a pair of similar but independently movable vanes 81, 82. These one piece vanes are preferably formed from material of uniform thickness and extend from end to end of slots 76, 77. Each is notched inwardly from one edge in a manner allowing each to mate with the other and permitting the vanes to pivot independently of one another within the plane of their respective seating slots 76, 77. Thus, the shape of the notch in vane 81 is best shown in FIGURE 2 as comprising a narrow-mouthed sector-shaped notch 83 opening inwardly from the forward straight edge of the vane. Vane 82, on the other hand, is notched inwardly from its rear central edge to provide a wide sector-shaped notch 84 having the configuration best shown in FIGURES 4 and 5. Notch 84 receives and straddles the connecting web portion 85 of vane 81. The corresponding connecting web 86 of vane 82 extends crosswise of cutout 83 in vane 81. Although vanes 81 and 82 are shown as unitary it will be recognized that they may be made in separate parts and suitably biased into sealing engagement with the cavity wall and with the inner surface of the cavity closure plate.

Figure 5:
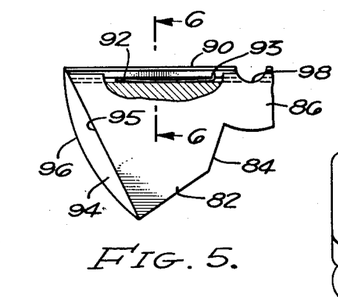
FIGURE 5 is a fragmentary side view of one of the movable vanes, parts being broken away to show interior structural details.
Figure 6:
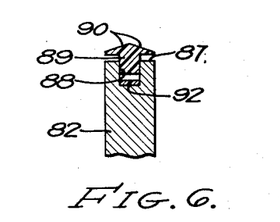
FIGURE 6 is an enlarged fragmentary sectional view taken along line 6—6 on FIGURE 5 showing details of the movable sealing lip of the vanes.
Figures 7, 9:
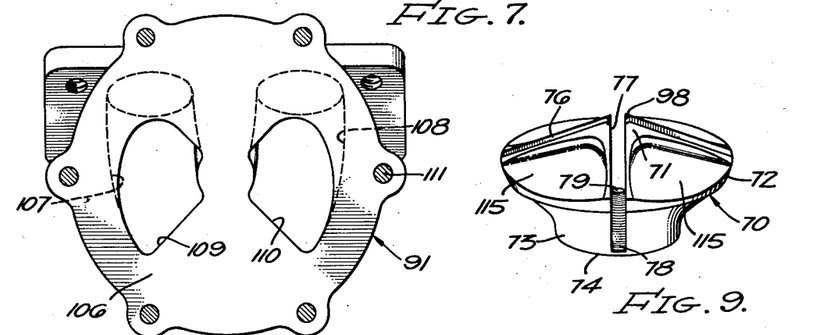
FIGURE 7 is a view of the closure plate as viewed from its interior side along the plane indicated by line 7—7 on FIGURE 2.
FIGURE 9 is a perspective view of the rotor.

Preferably the upper straight edge 87 of each vane has a shallow groove 88 extending lengthwise thereof seating the stem 89 of a combined sealing and bearing strip of generally T-shape in cross-section, having its opposite face edges 90, 90 inclined as is indicated in FIGURE 6 to have close sealing engagement with the inner surface of a closure plate 91 for cavity 24. The described sealing strip is preferably formed of a suitable long-wearing bearing material having a low co-efficient of friction and is adapted to be held resiliently in light surface contact with cover plate 91 by a light leaf spring 92 interposed between the bottom of groove 88 and the rear edge of the sealing element. As is shown in FIGURE 5, spring 92 has an upturned end 93 anchored in the rear edge of the sealing strip, the longer leg of the spring being bowed with its mid-portion lying against th bottom of groove 88.

The opposite ends of vanes 81 and 82 are also preferably provided with strips 94 of bearing material bonded to the opposite ends of the vanes along the straight edge 95. The outer edges 96 of strips 94 are contoured to form a close sealing fit with the side wall of cavity 24.

It is pointed out that all parts of vanes 81, 82, including the sealing and bearing elements, may be made of suitable high strength non-metallic materials such as certain of the plastics.

Referring to FIGURES 2 and 4, it will be seen that the intersecting straight edges of vanes 81 and 82 are cut away to form a semi-spherical socket 98 seating a complementarily shaped sealing element 99 here shown as being semi-spherical in shape and as having a flat diametric surface 100 bearing flush against the inner central surface of cover plate 91. As will be best appreciated from a consideration of FIGURE 2, sealing element 99 serves to prevent the exchange of liquid between the quadrants of the fluid cavity which would otherwise occur through the notches 83, 84 required at the intersecting portions of vanes 81, 82. The diameter of sealing element 99 may be no greater than the diagonal distance across the intersection of the vane seating slots 76, 77 or it may be of somewhat larger diameter in which case it is necessary to form a portion of the spherical socket 98 in the apex portion of conical end 71 of the rotor. Irrespective of size, seal 99 serves the highly important function of providing a floating fluid seal between the interior of cover plate 91 and the cooperating portions of the rotor assembly at the junction of vanes 81, 82. In all operating positions of these vanes and irrespective of their pivoted positions relative to one another, sealing element 99 is effective to prevent exchange of fluid between any pair of quadrants. Desirably, there is sufficient clearance between the spherical sealing element and the apex of the conical rotor to permit each vane to be positioned in cavity 24 by contact with the spherical surfaces of the vane ends and without hindrance from sealing element 99. A clearance not in excess of 5 mils is usually adequate and is so small that any leakage is negligible owing to the relatively small surface area of the sealing element.

The diametric open end of the fluid displacement cavity is provided with a flanged rim 103 having an annular groove 104 seating a sealing gasket 105. The combined manifold and closure plate 91 is adapted to be held assembled thereto by cap screws 111 having engagement in threaded bores 112 of flange 103. The flat interior surface 106 of closure plate 91 is finished to a high degree of accuracy and smoothness over which the sealing surfaces 90, 90 of the vanes rotate. Interior surface 106 cooperates with the conical end 71 of the rotor and with the intervening spherical portion of cavity 24 to form a fluid displacement chamber divided by vanes 81, 82 into four quadrants. Owing to the described floating support provided for vanes 81, 82 and for sealing element 99, the need for highly accurate relationships between the inner surface of the closure plate, the rotor, the vanes and cavity 24 is avoided. Also surface 106 of the closure plate need not be in the diametric plane of the displacement cavity and precise manufacturing tolerances are unnecessary.

Although the described displacement cavity may be ported either through the spherical surface of cavity 24, or through closure plate 91, or in part through one and in part through the other, the embodiment shown in FIGURES 1 to 8 is ported entirely through the cover plate. To this end the cover plate is provided with a pair of fluid passages 107 and 108 terminating in sector-shaped ports 109 and 110 spaced diametrically apart. Each of the circumferentially spaced end walls of these ports are positioned 90 degrees apart where maximum porting area is desired with one pair of adjacent radial edges lying equally spaced to either side of a plane through the axis of rotor 70 and the zero position of the rotor, it being understood that this is the position in which a blade has none or a minimum exposure above the conical end surface 71.

Figure 8:
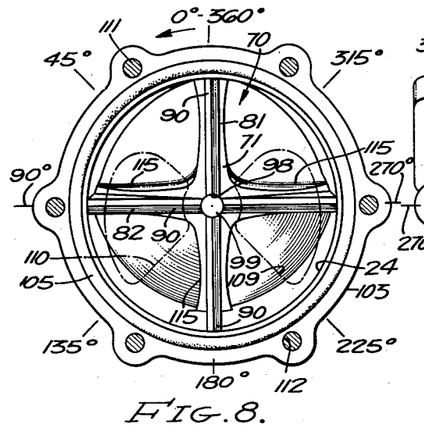
FIGURE 8 is a view looking into displacement cavity as viewed from line 8—8 on FIGURE 2.

Preferably the inlet and outlet ports 109 and 110 occupy the maximum possible portion of a 90 degree quadrant except that the inner and outer arcuate edges of the ports should be spaced sufficiently inwardly of the opposite ends of the individual sealing strips 90 90 to provide support therefor while the strips are rotating past the ports. This feature is best shown in FIGURE 8 wherein the position of ports 109 and 110 is indicated in phantom by dot and dash lines. Still another important function of the narrow outer peripheral edge of the ports will be brought out below in connection with a discussion of cavitation.

An important feature of the fluid displacement cavity designed for use with liquid is the relief of the conical end 71 of the rotor to form shallow pockets 115 between the vanes 81, 82. These shallow pockets may have the configuration best shown in FIGURE 9. Preferably the portion of the conical surface 71 immediately adjacent the vane slots 76, 77 is not cut away in order to provide maximum support for these vanes. Because of pockets 115 it will be apparent that a portion of the fluid contained in each displacement quadrant remains in the cavity for recirculation as each quadrant passes beyond the discharge port.

The relief provided by pockets 115 as well as the recirculation of a small quantity of liquid has several important advantages. Among these is the fact that reliance is placed on the intersecting vanes and of the disposition of the ports relative thereto to seal the intake side of the cavity from the discharge side thereby avoiding the need for the conical end of the rotor to make sealing contact with the closure plate to separate the inlet and discharge ports. Accordingly, the entire conical surface of rotor 70 can be spaced slightly from closure plate 91. This circumstance taken together with the relief of the conical surface in the form of the pockets 115 avoids any possibility of foreign material becoming lodged between conical surface 71 and the closure plate and the possibility of causing damage or stoppage of the pump.

Another important advantage dependent on the recirculation of fluid has to do with the increased efficiency of the pump and the material reduction in cavitation losses. Maximum benefits are obtained if the volume of recirculated liquid is adequate to form a wall of liquid against the outer spherical wall of the intake quadrant of a radial depth substantially equal to the radial spacing of the outer rim of the intake port 110 from the surface of cavity 24. Under these conditions the wall of liquid automatically maintained by centrifugal action against the spherical outer rim of the intake quadrant results in the remaining unfilled portions of the intake quadrant being substantially coextensive in area with intake port 110. In this manner the spacing of the outer peripheral edge of the intake port inwardly from the cavity wall to provide bearing support for the sealing strips is achieved without sacrificing maximum porting area.

If the outer rim of the intake quadrant were not filled with the recirculating liquid to the described radial depth, it would be necessary for the inflowing liquid to pass around the outer rim of the port and into this unfilled area with costly losses. In other words, cavitation would be unavoidable with attendant serious losses, particularly in the handling of more volatile liquids.

Figure 10:
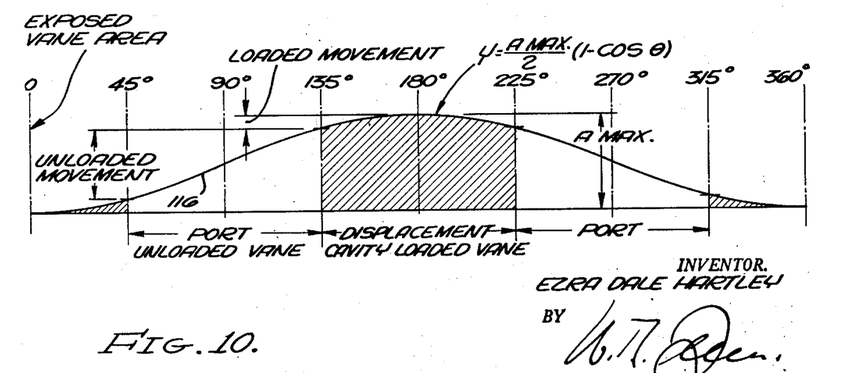
FIGURE 10 is a diagrammatic representation of numerous characteristics of the fluid handling device, the exposed vane area of one end of a single vane being plotted on the vertical co-ordinate in all positions thereof throughout a single revolution of the rotor.

Another important aspect of the described construction having a major beneficial influence on the operating efficiency will be best appreciated from a consideration of FIGURES 2, 8 and 10. To aid a discussion of this aspect, the rim of the displacement cavity has been subdivided into arcs of 45 degrees starting at the top of the figure wherein conical end 71 of the rotor is located closely parallel to the inner surface of closure plate 91. At the zero position, vane 81 is considered as having no exposed area. When this vane has rotated to the 45 degree position, the vane will have a relatively small exposed area, a fact graphically illustrated in FIGURE 10 by the distance between the horizontal datum line and the vertically overlying portion of the sine curve 116, it being understood that the exposed area of the radial end portion of any one vane in the structure here described varies in accordance with a sine curve during each complete revolution of the rotor. At the 45 degree position, the vane will be flush with the trailing edge of inlet port 110 and the plane of the vane will be inclined away from the plane of the port and toward the remote inner corner of the inlet quadrant. Accordingly, the advancing vane will be effective not only to entrain fluid into the cavity from the inlet passage 108 but to impel it inwardly and outwardly to the deeper end of the quadrant thereby greatly facilitating the filling of the cavity and minimizing, if not eliminating, any tendency for cavitation.

A factor greatly contributing to the efficiency of the cavity filling operation will be best understood by reference to FIGURE 10 and the well known principle that the instantaneous flow rate is the product of the angular velocity of the rotor and the instantaneous exposed vane area. The instantaneous velocity of the fluid entering the pump cavity is obtained by dividing the instantaneous flow rate by the exposed vane area at station 135 degrees (FIGURE 10) which is the constant area entering the pump cavity. Assuming a constant rotor velocity, it is apparent that the filling of the cavity with maximum efficiency and minimum loss is dependent on a maximum exposed area of the vane as the vane passes the leading edge of the inlet port coupled with a gradually increasing vane area during traverse of the displacement cavity.

That this is the result achieved in the present design is made clear by FIGURE 10. Thus, as the vane passes the 45 degree station its exposed area is close to its minimum value. During the next 90 degrees of rotation the exposed area increases along the sine curve 116 until at the point of cut-off opposite the 135 degree station it has approached its maximum value. It is therefore apparent that the greater portion of vane movement in its seating slot occurs while the vane is traversing the inlet and outlet port and during which period the vane is substantially unloaded due to the exposure of both sides of the vane to the inlet and outlet pressures. During the movement of the rotor from the 135 degree to the 225 degree station slight movement of the vanes occurs under loaded conditions as is indicated by the short vertical distance and change in the exposed area of the vanes at the top of sine curve 116. However, such movement is only some 14 percent of the total movement and is not particularly objectionable.

During the rotation of the vane past the outlet port 109 it will be understood that the inclination of the vane relative to the ported surface 106 of the closure plate is in a direction to impel the fluid outwardly through the port and generally axially of discharge passage 107. As was true of the fluid entering the inlet port, the outgoing fluid is discharged throughout a 90 degree movement of the rotor and while the effective discharge vane is traversing the discharge port.

At this time it can be pointed out advantageously that the relief pockets 115 in each quadrant of the rotor end serve another very important function when the unit is used to pump liquids. Thus, were it not for the relief provided by these pockets, the rotor would be locked and inoperative as the effective discharge vane reaches the leading edge of discharge port 109. This is for the reason that if a truly conical rotor end surface is used in conjunction with the closure plate to maintain sealed separation between the inlet and the outlet ports, the rotation of a vane between the 315 and the 360 degree position would be attempting to reduce toward zero the volume of the filled and sealed cavity in this 45 degree arc. Obviously this would be impossible under the desidered sealed operating conditions and the rotor would therefore be locked against rotation. By reason of the relief provided by pockets 115 in the present construction, this locking action by trapped fluid is completely obviated while a vane is advancing from the 315 to the 360 degree position.

Figure 11:
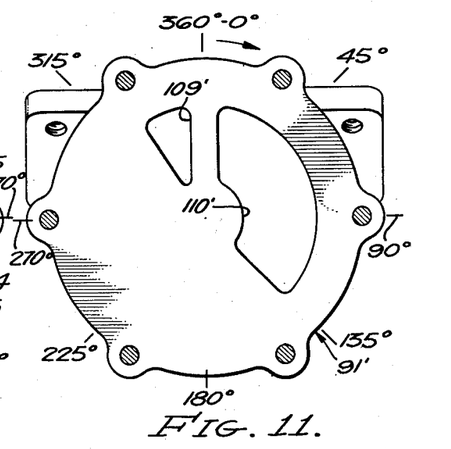
FIGURE 11 is a view similar to FIGURE 7 but showing a modified porting arrangement suitable when using the device as a gas compressor or as a pneumatic motor.

Referring to FIGURE 11, a modified manifold and closure plate is shown for mounting on the pump chamber in lieu of closure plate 91 when the device is to be used as a gas compressor or as a pneumatically operated motor. Closure plate 91' has the same general configuration as plate 91 except that fluid ports 109' and 110' are differently disposed and have widely differing areas. Furthermore, the two ports are disposed entirely to one side of a diametric line through the displacement cavity with port 109' being lying to the left of the zero degree station, as shown in FIGURE 11, and port 110' lying to the right of this station. It will be understood that the connecting fluid passageways, not shown but corresponding to passages 107 and 108, respectively, of FIGURE 7, have cross-sectional areas similar to the areas of the associated ports. It is also essential that the conical end of the rotor make sealing engagement with the closure plate in the zero position when used with the described porting arrangement.

If the closure plate 91' were mounted on a unit being employed as a compressor, port 110' would be the inlet port and the inflowing gas would be impelled into the intake cavity under the influence of the advancing vane as the vane leaves the zero degree position. The fluid continues to flow into the intake quadrant until the trailing vane of the cavity passes the leading edge of intake port 110'. The trapped quantity of gas is thereafter continuously compressed while the displacement quadrant rotates through a full 90 degrees following which the leading vane of the compression chamber opens into discharge port 109' allowing the compressed gas to be expelled.

If the second embodiment is to be used as a pneumatic motor the high pressure fluid enters the displacement cavity through port 109' causing the rotor to rotate counterclockwise as viewed in FIGURE 11 with the low pressure spent gas discharging through port 110'.

In the embodiments so far described a slight variation in the rate of fluid flow occurs, this variation being represented by the curved portion of sine curve 116 in FIGURE 10 between the 135 and 225 degree stations. For example, the rate of flow tends to increase from 135 degrees to 180 degrees whereas it decreases while passing from 180 degrees to 225 degrees. The variation or pulsing in the flow is relatively small and unobjectional in many applications.

The described flow variation for the two vane construction of this invention is to be contrasted with that occurring in a pump of similar design but using one vane. In the one vane design, the point of cut-off on the inflowing fluid could not occur later than the 90 degree position shown in FIGURE 10, and the outlet port would have to be so positioned that discharge could not occur beyond the 270 degree position of the vane. As a result, the rate of fluid discharge would be changing at the rate indicated by sine curve 116 from the 90 degree position to the 180 degree position and would be decreasing at the velocity indicated by this curve between the 180 degree position and the 270 degree position. Quite obviously, this extreme pulsing in the rate of flow is intolerable for many applications.

If the relatively slight variation in the flow rate occurring with the described two vane construction is objectionable, as it is for certain critical applications, a truly constant rate of flow is obtainable by use of the simple expedient shown in FIGURES 12 to 15. The combined manifold and closure plate 91" there shown is generally similar to the corresponding structure 91 of the first described embodiment, but differs in the provision of a recess 120 seating snugly therein a circular plate 121 having a spherical peripheral surface 122 corresponding to the spherical surface of pump cavity 24. The interior surface of plate 21 is accurately contoured with smoothly-merging hills and dales to present the rolling annular surface designated 123. All radial lines lying in surface 123 and passing through the center of disc 121 are straight lines with the exception of the central area of the surface opposite the spherical sealing element 99. The circular area opposite this surface 100 of sealing element 99 lies in a plane flush with the diametric end of displacement cavity 24. It is pointed out that the hills and dales are so formed in keeping with the above mentioned factors as to confine all relative movement between the vanes and the rotor to that portion of each revolution occurring between the 45 degree and 135 degree stations, and between the 225 and 315 degree stations. Likewise, the surface is so contoured that no movement of the vanes relative to the rotor occurs while the vanes are passing between the inlet and outlet ports, namely, between the 315 degree and the 45 degree positions and between the 135 degree and the 225 degree stations.

Figure 15:
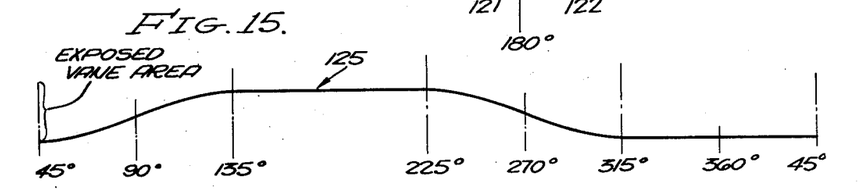
FIGURE 15 is a developed view of the intersection of a right cylinder with the contoured interior surface of the closure plate shown in FIGURES 12 to 14.

These critical features of surface 123 are depicted graphically in FIGURE 15, wherein the line 125 represents development of a circular line drawn on surface 123 and wherein the vertical displacement of the line above the datum plane represents the exposed vane area in each of the corresponding angular positions.

Figure 12:
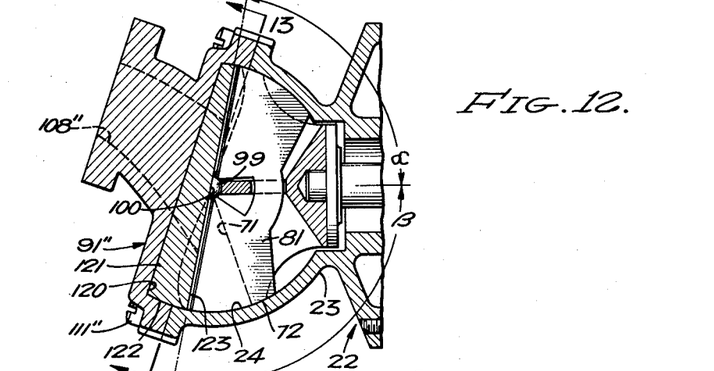
FIGURE 12 is a fragmentary transverse sectional view through a second preferred embodiment featuring a specially-contoured surface on the cavity closure plate providing constant pulse-free fluid flow.

The nature of contoured surface 123 may be expressed mathematically by reference to FIGURE 12 showing the relationships of the angles alpha and beta formed between the axis of rotation of rotor 70 and straight diametric lines passing through the center of surface 123. It is pointed out that the sum of alpha and beta is 180 degrees in all positions of the rotor. Surface 123 is so contoured that the angle alpha remains constant between 315 and the 45 degree stations and such that the angle beta remains constant between the 135 degree and the 225 degree stations. It will also be understood that angles alpha and beta may be varied at will to produce a smooth transition between the 45 and 135 degree stations and between the 225 and 315 degree stations so long as their sum remains 180 degrees. It follows that all diametric lines drawn along surface 123 and passing through the focal point of the semispherical cavity 24 are straight lines. It is for this reason that the straight edges of vanes 81, 82 in contact with surface 123 form a fluid-tight seal at all times and in any rotary position of the vanes with respect to surface 123. The same is equally true of the flat closure plate 91 of the first described embodiment.

Figure 13:
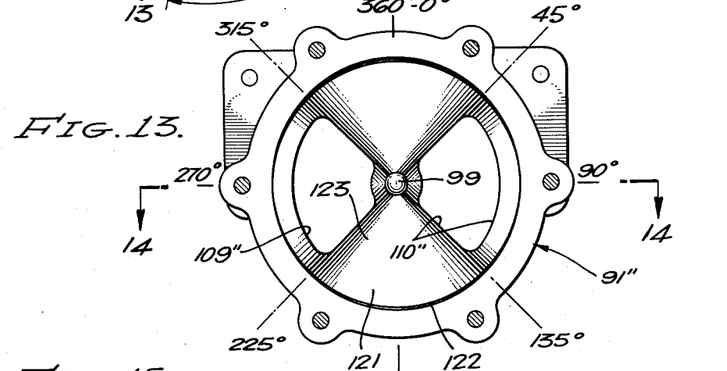
FIGURE 13 is a view taken from the interior of the closure plate as viewed from line 13—13 on FIGURE 12.
Figure 14:
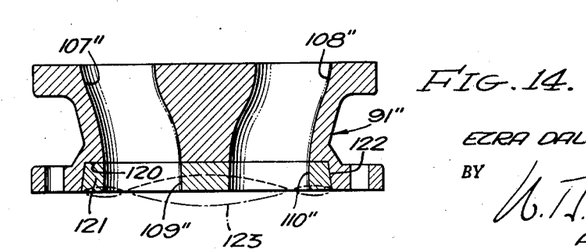
FIGURE 14 is a transverse sectional view through the closure plate taken along line 14—14 on FIGURE 13.

It will, of course, be recognized that if the arcuate extent of the inlet and outlet ports 109″ and 110″ is less than the 90 degrees shown in FIGURE 13, then the arcuate extent of the hills and dales forming contoured surface 123 may be correspondingly modified.

It is pointed out in particular that the constant flow characteristics described above are obtainable with the structure shown in FIGURES 1 to 10 simply by removing cover plate 91 and replacing it with cover plate 91″ and the generally planar specially contoured disc 121, the spherical surface 122 of this disc mating snugly within the rim portions of spherical cavity 24 of the FIGURES 1 to 8 construction.

Referring now to FIGURES 16 to 19, there is shown still another preferred embodiment of the invention employed as a booster pump in a fuel supply system for an aircraft engine. The booster pump, designated generally 130, is generally similar to the construction described in connection with pump unit 10 of the first embodiment and is adapted to be supported in a vertical position directly on the bottom of a fuel tank 131. End cap 132 for cavity 24′ will be observed as supported in spaced relation to the bottom of the tank as on integral legs 133. The driving motor enclosed within the shell 26′ will be understood as identical with that described above except that suitable packing gaskets are employed to render it fluid-tight. The rotor 70′ is identical to that described in FIGURE 1 and is provided with a pair of diametric relatively movable vanes 81′, 82′ of the same construction and arrangement previously described.

The bell-shaped inlet fluid passage 107′ opens downwardly toward the bottom of the tank and terminates in a sector-shaped port 135 substantially identical with port 109 of the first described embodiment. The outlet of the booster pump construction here illustrated differs in that it opens through a port 136 formed in the side wall of spherical cavity 24′ into a discharge passage 137 leading through a conduit 138 to the inlet of a high pressure pump 139.

Figures 16, 17, 18, 19:
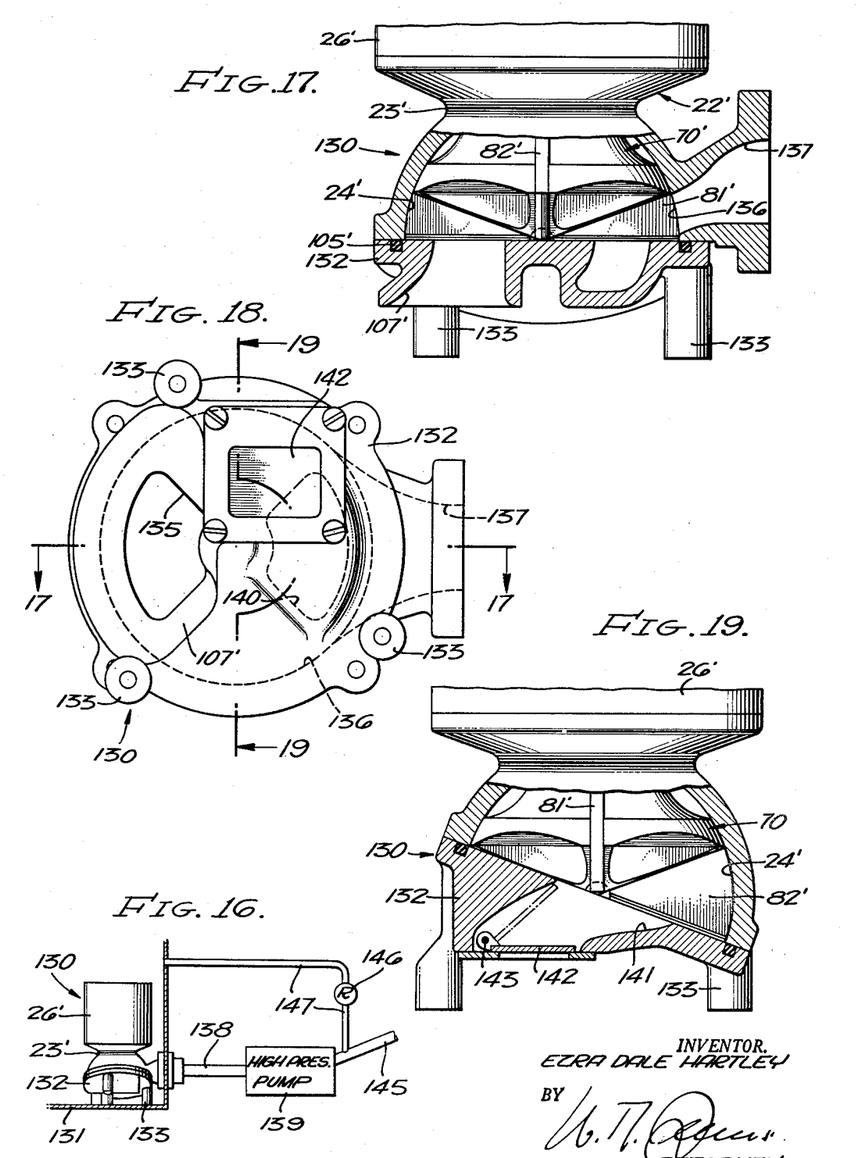
FIGURE 16 is a diagrammatic representation of an aircraft fuel system showing still another preferred embodiment of the present invention employed as a submerged booster pump and located inside the fuel tank with its discharge feeding the inlet of a high-pressure pump.
FIGURE 17 is a transverse sectional view through the pump chamber on an enlarged scale passing through the inlet and outlet openings along line 17—17 on FIGURE 18.
FIGURE 18 is a bottom plan view of the pump unit shown in FIGURE 16.
FIGURE 19 is a transverse sectional view taken along line 19—19 on FIGURE 18.

Closure plate 132 is provided with a sector-shaped port 140 diametrically opposite inlet port 135, port 140 opening into a bypass fluid passageway 141 (FIGURE 19) normally closed by a flap valve 142 at its outer end. Valve 142 is pivoted to the interior of the casing on a pivot pin 143 and is normally held closed both by gravity and by virtue of the discharge pressure to which its upper side is subjected under operating conditions. It is pointed out that the bypass valve remains closed under all conditions except when the pressure on the discharge side of the pump falls below that inside fuel tank 131. Normally this will occur only under stalled motor conditions and with high pressure pump 139 in operation. Under these circumstances the suction pressure of pump 139 is effective to lift valve 142 to its open dotted line position as shown in FIGURE 19 thereby allowing pump 139 to continue pumping fuel from the tank notwithstanding the stalled conditions of the positive displacement pump 130.

The high pressure output from pump 139 is conducted through conduit 135 to the aircraft engine, the pressure being maintained constant by any suitable pressure relief valve 146 connected in a conduit 147 leading back to an upper portion of the fuel tank.

While the particular fluid handling device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a fluid handling device of the positive displacement type having a main casing provided with a spherically contoured cavity and a diametric end wall, rotor means having a conical surface closely spaced from said end wall and a spherically contoured rear surface socketed in said cavity and provided with shaft means extending through the wall of said casing in a position to rotate said rotor about an axis such that one element only of said conical surface lies parallel to but spaced from the plane of said end wall, a pair of vanes movably supported in circumferentially spaced radial slots of said rotor, semispherically surfaced seal means freely and floatingly interposed between said rotor and said pair of vanes with its flat side slidingly supported against the inner surface of said end wall, and all of the juxtaposed contacting surfaces of said end wall, of said vanes, of said rotor and of said seal means being relatively movable and contoured to have close sealing contact with one another in the various positions of said rotor about its axis.

2. A rotor element for use in a fluid handling device of the positive displacement type employing a casing with a semispherical cavity closed along a generally diametric plane therethrough by an end wall, said rotor element having a generally conical shaped end facing said end wall and an opposed base end having an outer peripheral rim of spherical contour adapted to nest smoothly with the surface of said spherical cavity, the remainder of the base end of said rotor element being relieved and lying spaced inwardly from said cavity surface, the conical end of said rotor having a pair of diametric slots intersecting one another at right angles, the apex of said conical end being formed with a spherical cavity having a diameter approximately the diagonal distance across said slots at the intersection thereof, and a semispherical seal movably and floatingly socketed in said cavity, the major surface areas of the conically shaped end of said rotor between said slots being cut away to form depressions, there being a separate one of said depressions between each adjacent pair of slots.

3. A positive displacement fluid handling device having a casing provided with a cupped semispherical cavity closed across its rim edge by a closure plate the inner surface of which is so shaped that any diameter line lying therein and passing through the focal point of said semispherical cavity is a straight line, a conical ended rotor in said cavity having its rim journaled in close sealing contact with the cavity side walls, means confining said rotor to rotary movement, a driving shaft fixed to and rotating on the same axis as said rotor and supporting an element of said conical end generally parallel to the interior surface of said closure plate and with all portions of said conical end spaced inwardly therefrom, a plurality of vanes mounted in diametric slots opening through the conical end of said rotor each having a straight edge sealingly engaging the inner surface of said closure plate, and a pair of fluid passages opening into said cavity at diametrically spaced areas spaced to either side of the area of parallelism between said face plate and the conical end of said rotor, each of said passages having a width circumferentially of said cupped cavity not in excess of the corresponding circumferential spacing between adjacent edges of said vanes whereby the fluid handling portions of said cupped cavity operate substantially flooded, the spacing between said closure plate and the closest adjacent surface of the conical end of said rotor being sufficient to prevent sealing action or trapping of small particles of solid foreign matter between said rotor and closure plate as well as for retaining a predetermined minimum quantity of fluid in said cavity for recirculation therethrough.

4. In a fluid handling device of the positive displacement type having a casing provided with a semispherical cavity, said casing having a manifold plate closing the diametric face of said cavity and having a pair of large area flow passages opening through ports at the interior surface thereof, the adjacent peripheries of said ports being close to and on diametrically opposed sides of the center of said manifold plate and each having an arcuate span circumferentially of said cavity of approximately 90 degrees, a rotor having a conical end facing but spaced axially from said manifold plate and having a spherically contoured opposed narrow rim nested against said cavity wall, means confining said rotor to rotary movement including a driving shaft secured to said rotor element for rotation about the identical axis and journaled in the spherical portion of said casing with its axis inclined to the plane of said manifold plate, said rotor having a plurality of vanes movably supported in slots opening through the conical end thereof with their exposed edges in sealing engagement with the interior surface of said manifold plate and cooperating therewith and with said rotor to form four quadrant-shaped fluid chambers which are so related to said large area flow passages that said fluid chambers operate fully flooded, the port ends of said fluid passages on diametrically opposed sides of said semispherical cavity being noncircular and having a flow area slightly less than one-half the face area of said quadrant-shaped chambers and a circumferential extent of approximately 90 degrees.

5. A fluid handling device as defined in claim 4 characterized in that the port ends of said fluid passages are substantially identical in shape and size with their circumferentially spaced ends substantially radial and separated from one another by approximately 90 degrees, the inner and outer radial edges of said ports overlapping the juxtaposed opposite ends of the portions of said vanes forming said quadrant-shaped fluid chambers thereby preventing said vanes from pivoting into the port as the vanes rotate therepast.

6. A fluid handling device as defined in claim 4 characterized in that the opposite faces of said vanes are parallel to the rotor axis and inclined to the inner surface of said manifold plate with the advancing face of the trailing vane in a fluid delivery quadrant being inclined in a direction to force fluid outwardly into one of said passages and the advancing trailing vane of a diametrically opposed intake quadrant being inclined in a direction to direct inflowing fluid thereinto and centrifugally toward the outer portions of the chamber as said rotor is being rotated.

7. A fluid handling device as defined in claim 4 characterized in that the opposite faces of said vanes are parallel to the rotor axis and inclined to the inner surface of said manifold plate in such manner that as the vanes are rotated the inclined vane surfaces are effective to impart movement of fluid outwardly into one of said fluid passages while entraining fluid from the other of said passages and impelling the entrained fluid into the outer extremities of a quadrant-shaped fluid chamber.

8. A fluid handling device of the positive displacement type having a cupped casing provided with a circular cavity, a rotor having a generally conical end rotatably supported in said cavity with its rim having a continuous running fit with the juxtaposed wall of said circular cavity and with one side of said conical end parallel and closely spaced to a closure plate for said cupped casing, shaft means secured to said rotor opposite said conical end wall, a pair of vanes mounted in radial slots opening through the conical end of said rotor and having straight edges sealingly engaging said closure plate, major portions of the conical end of said rotor in areas between said vanes being removed to form shallow depressions therein, a semispherical sealing member socketed in a spherical cavity at the apex of said conical end and the intersection of said vanes with its flat face floatingly supported against the juxtaposed flat surface of said closure plate, and large area fluid ports opening into said cavity on diametrically opposed sides of said floating sealing member and each having an area slightly less than one-fourth the interior surface area of said closure plate and each confined to a separate quadrant of said circular cavity.

9. A fluid handling device as defined in claim 8 characterized in that said fluid ports are located in said closure plate with the end wall of one extending generally radially and substantially in diametric alignment with the radial end wall of the other port, said ports being spaced approximately 90 degrees apart, and a driving motor attached to and having a portion of its housing integral with said cupped casing and coupled directly to said rotor on the end thereof remote from said conical end.

10. A fluid handling device of the positive displacement type having a main casing member provided with a semispherically surfaced fluid handling cavity traversed and closed by a generally planar end wall member fixed to said casing, a rotor element having a generally conical shaped end facing said end wall with one side of said conical end substantially parallel to and spaced from said end wall and an opposed base end having an outer peripheral rim adapted to nest smoothly with the surface of said spherical cavity, the conical end of said rotor having a plurality of diametric slots, vanes seated in said slots and free to move in the plane of said slots and forming a seal with said end wall, said rotor being spaced inward of said end wall at the position of parallelism, one of said casing and end wall members having inlet and outlet openings located on diametrically opposed sides of said fluid handling device and each confined to separate quadrants of said fluid handling cavity and separated from one another by separate and different quadrants, and one of said different quadrants being bisected by that particular element of said rotor end which lies parallel to said casing end wall.

11. A fluid handling device comprising a casing having a cupped cavity terminating in a circular rim, a closure plate for said cavity, a rotor having a close running fit within said cavity and having a generally conical shaped end facing said closure plate, a rotary driving shaft connected to an supporting said rotor for rotation with the axis of said conical end inclined to a plane across the rim of said cavity, a plurality of vanes seated in diametric intersecting slots in said rotor, a pair of diametrically disposed fluid ports opening into said cavity through said closure plate, the interior surface of said closure plate being so contoured as to pivot said vanes within their respective seating slots while said vanes are disposed opposite said ports and for holding said vanes substantially stationary in said slots while the vanes are being rotated between said ports.

12. A fluid handling device as defined in claim 11 characterized in that said ports subtend an arc of approximately 90 degrees and are spaced apart by approximately 90 degrees.

13. A positive displacement non-pulsing liquid pump having a casing provided with a circular cup-shaped cavity closed across its rim by a closure plate, said plate having a pair of diametrically opposed quadrant-shaped passages opening into said cavity to either side of the center of said plate, a conically ended rotor rotatably supported in said cavity with one side of said cone in closely spaced relation to said closure plate, a pair of diametric vanes movably supported in slots of said rotor arranged at 90 degrees to one another with their longitudinal edges in sealing engagement with said closure plate, the interior surface of said closure plate being so contoured as to maintain said vanes stationary in said slots while the vanes are rotating out of registry with said ports and for pivoting said vanes within said slots while the vanes are rotating past said ports.

14. A positive displacement non-pulsing liquid pump having a casing provided with a circular cup-shaped cavity closed across its rim by a closure plate, said plate having a pair of diametrically opposed quadrant-shaped passages opening into said cavity to either side of the center of said plate, a conically ended rotor rotatably supported in said cavity with one side of said cone in closely spaced relation to said closure plate, a pair of independently movable diametric vanes seated in slots of said rotor arranged at 90 degrees to one another with their longitudinal edges in sealing engagement with said closure plate, and means for alternately moving one vane while holding the other stationary relative to said rotor during each quarter revolution of said rotor, substantially all movement of said vanes relative to said rotor being constrained by said means to occur while said vanes are free of substantial fluid load and whereby the rate of fluid delivery is substantially constant.

15. A liquid pump as defined in claim 14 characterized in that said means for alternately moving said vanes relative to said rotor comprises a guide plate seated on the interior side of said closure plate and having alternately arranged hills and dales merging smoothly with one another circumferentially of said guide plate, and all diametric planes through said guide plate intersecting the surface thereof along straight lines.

16. A closure plate for the rim end of a casing having a cup-shaped cavity, said cavity being adapted to seat rotatably a rotor having a conical end provided with intersecting radial slots seating a pair of diametric vanes, said closure plate having a circular guide plate supported on one side thereof provided on its face with alternate smoothly merging hills and dales adapted to have sealing engagement with the straight edges of the vanes carried in said rotor, all diameter lines lying in the surface of said hills and dales being straight.

17. A fluid compressor comprising a casing having a cup-shaped cavity, a closure plate secured across the rim of said cavity, a rotor having a conical end having a close running fit with the side walls of said cavity and having a driving shaft secured to the opposite side thereof and journalled to rotate said rotor with one side of said cone close to but out of sealing contact with the interior of said closure plate, said rotor having a pair of vanes movably seated in uniformly spaced diametric slots opening through the conical end of said rotor with one edge of said vanes in sealing engagement with said closure plate, said closure plate having a pair of large area fluid passages confined substantially to one half of said plate, the inlet one of said passages having a cross-section appreciably greater than the area of one quadrant of said closure plate, and the outlet one of said passages having a cross-section appreciably less than the area of one quadrant of said plate, said inlet passage having a circumferential extent of approximately 135 degrees and said outlet passage having a circumferential extent of less than 45 degrees 18. A compressor as defined in claim 17 characterized in that the inner terminal ends of said passages open into said cavity inwardly of the outer and central end portions of said vanes whereby the opposite radial edges of said passage ends overlie and support the vane edges as the vanes rotate past said passage ends.

19. In a liquid pump of the positive displacement type having a casing provided with a semi-spherical cavity, a diametric closure plate for said cavity, a rotor having a generally conical end facing said closure plate with one side of its conical surface closely spaced from said closure plate and out of sealing contact therewith, said rotor having a pair of intersecting diametric vanes seated in slots opening through the conical end of said rotor and having sealing engagement with said closure plate, said conical end of the rotor having large area shallow depressions located between said vanes, said closure plate having a large area liquid inlet port confined to and occupying the major portion of an area opposite one quadrant of said cavity, the inner radial edge of said port being close to the center of said plate and its outer radial edge being spaced inwardly from the side wall of said cavity to support the outer ends of said vanes as they rotate past the port, the trailing edge of said port being approximately 45 degrees from a radial zone of said cavity having a minimum volume, the leading and trailing edges of said port spanning an arc of approximately 90 degrees, the rotation of said rotor and vanes past said port at a uniform rate and in a direction to increase the exposed area of the vane transversing said port being effective to increase the exposed area of said traversing vane at a gradually increasing rate, and the liquid being recirculated being held by centrifugal action at the peripheral side wall of the intake quadrant and the inflowing liquid being projected forwardly and outwardly toward the deeper portions of the intake quadrant.

20. In a rotary compressor of the type having a casing provided with a semi-spherical cavity, a closure plate sealed across the diametric end of said cavity, a rotor seated in said cavity having a low-height smooth-surfaced conical end so positioned as to have a radial line of sealing contact with said closure plate as the rotor rotates about its axis, shaft means secured to said rotor and journalled in said casing for driving said rotor, said rotor having a pair of vanes seated in diametric slots opening through the conical end of said rotor and cooperating with said closure plate to divided said cavity into four quadrants, said closure plate having inlet and outlet passages opening into said cavity through ports spaced to either side of the radial line of sealing contact between said rotor and said closure plate, the outlet one of said ports being appreciably less than one half the area of the inlet one of said ports, both of said ports being located to one side of a diametric line through the center of the closure plate, and the fluid undergoing compression being sealed within one of said quadrants and undergoing compression substantially throughout a quarter turn of said rotor.

21. A fluid handling device of the positive displacement type having a main casing provided with a spherical surfaced cavity traversed and closed by a generally planar end wall, a rotor element having a generally conical shaped end facing said end wall with one side of said conical end substantially parallel to said end wall and an opposed base end having an outer peripheral rim adapted to nest smoothly with the surface of said spherical cavity. the conical end of said rotor having a plurality of diametric slots, major portions of the surface areas of said rotor between said slots being relieved to provide shallow pockets, vanes seated in said slots and free to move in the plane of said slots and forming a seal with said end wall, said end wall having a plurality of ports of approximately 90 degrees in circumferential width opening into said cavity and diametrically spaced to either side of the line of parallelism between said end wall and the conical end of said rotor and spaced substantially equally from each other on both sides thereof.

References Cited in the file of this patent

UNITED STATES PATENTS

| | | |
|---|---|---|
| 595,745 | Taber | Dec. 21, 1897 |
| 1,881,575 | Herzog | Oct. 11, 1932 |
| 1,992,374 | Kempthorne | Feb. 26, 1935 |
| 2,016,605 | Kempthorne | Oct. 8, 1935 |
| 2,152,498 | Quiroz | Mar. 28, 1939 |
| 2,212,417 | George | Aug. 20, 1940 |
| 2,319,856 | Fowler | May 25, 1943 |
| 2,708,413 | Loewen | May 17, 1955 |
| 2,825,286 | White | Mar. 4, 1958 |
| 2,832,198 | Pichon | Apr. 29, 1958 |

FOREIGN PATENTS

| | | |
|---|---|---|
| 374,153 | France | June 6, 1907 |
| 251,525 | Germany | Oct. 4, 1912 |
| 227,342 | Great Britain | Jan. 15, 1925 |
| 373,535 | Great Britain | May 26, 1932 |